Patented Apr. 20, 1937

2,077,854

UNITED STATES PATENT OFFICE 2,077,854

CHROMATABLE MONOAZO-DYESTUFFS AND A PROCESS FOR THEIR MANUFACTURE

Bernhard Richard, Basel, Switzerland, assignor to firm J. R. Geigy A. G., Basel, Switzerland No Drawing. Application June 16, 1936, Serial No. 85,621. In Germany July 1, 1935

8 Claims. (Cl. 260—92)

According to the present invention valuable monoazo-dyestuffs capable of being chromed are made by combining the diazo compound of an amine of the general formula:

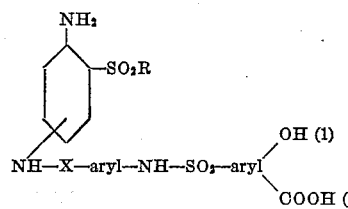

in which R represents OH, alkyl, aralkyl, aryl, alkyl-, aralkyl- or arylamino groups or the radical of an aryl sulphonic acid and X represents —CO— or —CO—CH₂O—, in an acid solution with 2-amino-8-hydroxynaphthalene-6-sulphonic acid.

The new dyestuffs dye wool in an acid bath shades which when after-chromed are pure red to red-violet and are very fast to light and to fulling and are furthermore distinguished by a good capacity for being discharged.

The following examples illustrate the invention, the parts being by weight:

Example 1

50.8 parts of the aminosulphonic acid of the following formula:

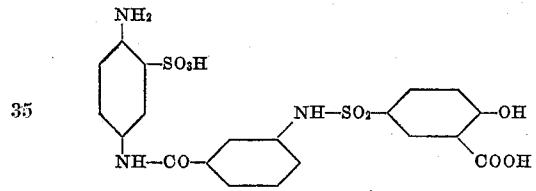

(obtained by condensation of 4-(meta-aminobenzoyl)-phenlyene-diamine-2-sulphonic acid with salicylsulphochloride in aqueous solution) are dissolved in hot water together with sodium carbonate and the solution is cooled and mixed with 7 parts of sodium nitrite. The solution is then allowed to run slowly into 60 parts of concentrated hydrochloric acid diluted with ice and water whilst stirring. The sparingly soluble diazo-compound thus formed is filtered, stirred with water and the suspension is introduced slowly and whilst stirring into a solution of 26.2 parts of sodium 2-amino-8-hydroxy-naphthalene-6-sulphonate and 20 parts of sodium acetate. Coupling begins immediately and is completed after 24 hours, whereupon the solution is heated to about 40° C., and the dyestuff is precipitated by the addition of common salt, filtered and dried.

It is a red powder which dissolves in water to a red solution and in concentrated sulphuric acid to a brown-red solution. It dyes wool in an acid bath pure red shades which when afterchromed become remarkably fast to light and to fulling without appreciable alteration in the shade; at the same time they are dischargeable to pure white.

Similar dyestuffs are obtained by using a sulphochloride of a cresotinic acid instead of salicylsulphochloride in the preparation of the diazo-component. Instead of the meta-aminobenzoyl derivative the para-amino-benzoyl derivative may be used and instead of the paraphenylene-diamine sulphonic acid the 1,3-phenylenediamine-4-sulphonic acid may be used; in this case there are obtained dyestuffs which are respectively somewhat bluer or somewhat yellower than that above described.

Example 2

53.7 parts of the compound of the formula:

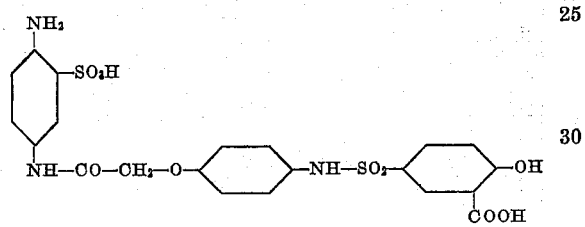

(obtained by condensation of 4-(4'-aminophenoxy)-acetylamino-1-aminobenzene-2-sulphonic acid with the salicylsulphochloride referred to in Example 1) are dissolved in water and the solution is cooled and mixed with 7 parts of sodium nitrite, and the solution thus obtained is allowed to run into 60 parts of concentrated hydrochloric acid diluted with ice and water. When diazotization is finished the whole is run directly into a solution containing 26.2 parts of sodium 2-amino-8-hydroxynaphthalene-6-sulphonate and 20 parts of sodium acetate. Coupling begins at once and is finished after 20 hours, whereupon the dyestuff is worked up as indicated in Example 1.

The properties of the dyestuff resemble those of the dyestuff of Example 1; both the acid dyeings and the after-chromed dyeings are red.

Similar dyestuffs can be obtained if one uses a sulphochloride of another ortho-hydroxybenzenecarboxylic acid, or the 1,3-diaminobenzene- 4-sulphonic acid or a meta-aminophenoxyacetic acid derivative for the production of the amine used for the diazotization. Obviously, one, two or all three at a time of these possibilities of variation can be utilized. The properties of the dyestuffs are similarly varied as in Example 1.

*Example 3*

66.1 parts of the compound of the formula:

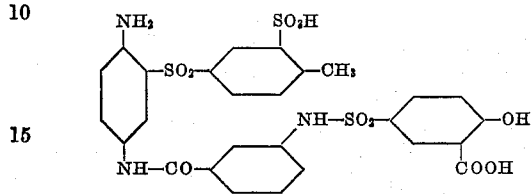

(obtained by condensation of 2,5-diamino-3'-sulpho - 4' - methyl-1,1'-diphenylsulphone — obtainable as described in the U. S. Patent No. 1,467,711—with 3-nitrobenzoyl chloride followed by reduction and further condensation with the salicylsulphochloride referred to in Example 1) are dissolved in water and the solution is cooled and mixed with 7 parts of sodium nitrite. The whole is introduced slowly into 60 parts of concentrated hydrochloric acid diluted with water and ice and the diazo-compound which precipitates is filtered. It is then made into a paste with water and the paste introduced gradually whilst stirring into a solution containing 26.2 parts of sodium 2-amino-8-hydroxynaphthalene-6-sulphonate and 20 parts of sodium acetate. After about 12 hours the whole is heated to about 50° C. and the dyestuff is salted out and dried.

Its acid and after-chromed dyeings on wool are pure red-violet; the chromed dyeings are of very good fastness to light, fulling and potting and are easily dischargeable to pure white.

Dyestuffs having similar properties but having somewhat yellower shades are obtained from diazo-compounds in which the $SO_2$-group in ortho-position to the amino-group is combined with an alkyl- or aralkyl-group or an alkyl- or a dialkylamino-, aralkylamino-, aryl- or arylalkylamino group instead of the group indicated in the above formula. Besides, the different possibilities of variation mentioned in Examples 1 and 2 may be noted. By alkyl, the groups methyl, ethyl, propyl, butyl etc., by aralkyl, the substituted and unsubstituted benzyl group and by aryl, substituted or unsubstituted nuclei of the benzene series are meant.

*Example 4*

58.1 parts of the compound of the formula:

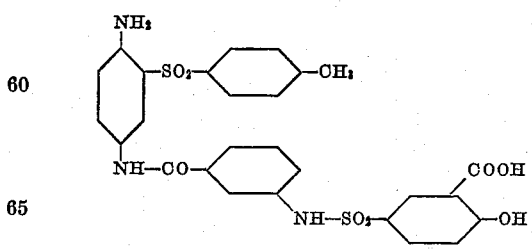

(obtained by condensation of 2,5-diamino-4'-methyl-diphenylsulphone — see German Patent No. 282,214—with 3-nitrobenzoyl chloride, reduction of the product with zinc dust and acetic acid and condensation of the reduction product with salicylsulphochloride) are dissolved in warm water together with sodium carbonate and the solution is cooled and mixed with 7 parts of sodium nitrite and the whole is slowly introduced into 60 parts of concentrated hydrochloric acid diluted with water and ice. When diazotization has occurred the diazo-compound is introduced gradually into a solution of 26.2 parts of sodium 2 - amino - 8 - hydroxynaphthalene-6-sulphonate and 20 parts of sodium acetate. After 10 hours the whole is heated to 50° C. and the dyestuff is precipitated by common salt, filtered and dried.

Its acid and after-chromed shades on wool are pure red-violet; the chromed dyeings are very fast to light, fulling and potting and are easily dischargeable to pure white.

For the possibilities of variation in the sulphone group and in the remainder of the molecule of the diazo component, the modifications mentioned in the above examples, particularly in Example 3 may also be noted. The thus obtainable dyestuffs would possess similar properties to those above indicated.

What I claim is:—

1. Monoazo-dyestuffs capable of being chromed formed by combining the diazo-compound of an amine of the general formula:

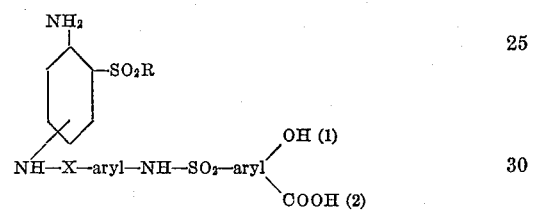

in which R means a member of the group consisting of OH, alkyl, aralkyl, aryl, alkyl-, aralkyl-, arylamino groups and the radical of an aryl sulphonic acid and X means a member of the group consisting of —CO— and —CO—CH₂O—, with 2-amino-8-hydroxynaphthalene-6-sulphonic acid in an acid solution.

2. A monoazo-dyestuff formed by combining the diazo-compound of an amine of the formula:

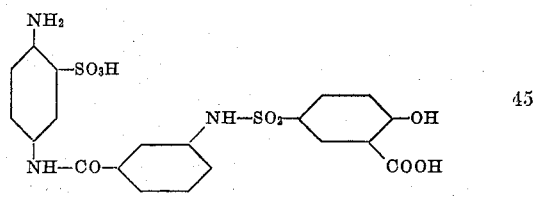

with 2-amino-8-hydroxynaphthalene-6-sulphonic acid in an acid solution.

3. A monoazo-dyestuff formed by combining the diazo-compound of an amine of the formula:

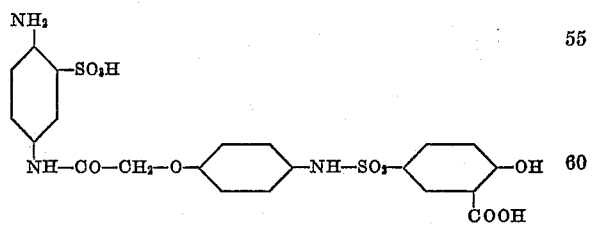

with 2-amino-8-hydroxynaphthalene-6-sulphonic acid in an acid solution.

4. A monoazo-dyestuff formed by combining the diazo-compound of an amine of the formula:

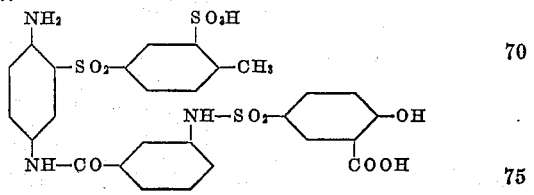

with 2 - amino - 8 - hydroxynaphthalene-6-sulphonic acid in an acid solution.

5. A monoazo-dyestuff capable of being chromed of the general formula:

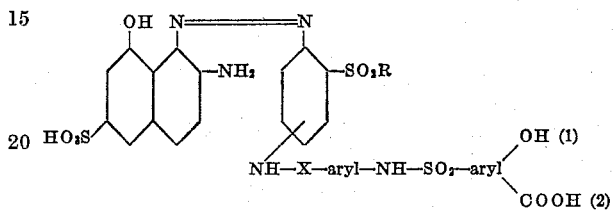

in which R means a member of the group consisting of OH, alkyl, aralkyl, aryl, alkyl-, aralkyl-, arylamino groups and the radical of an aryl sulphonic acid and X means a member of the group consisting of —CO— and
—CO—CH2O—, dyeing wool in an acid bath red to red-violet shades which when after-chromed are very fast to light and fulling and have a good capacity for being discharged.

6. The monoazo-dyestuff of the formula:

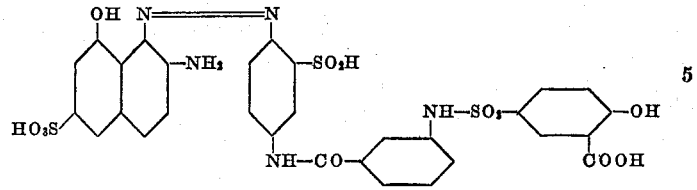

being a red powder soluble in water and concentrated sulphuric acid and yielding on wool after-chromed dyeings which are pure red and very fast to light and fulling.

7. The monoazo-dyestuff of the formula:

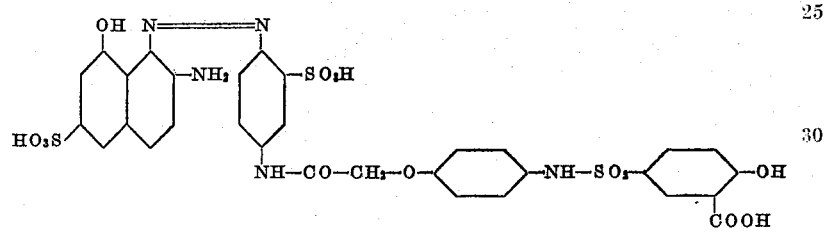

yielding on wool after-chromed dyeings which are red and of very good fastness to light and fulling.

8. The monoazo-dyestuff of the formula:

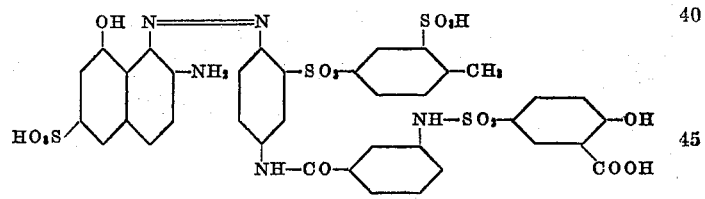

yielding on wool after-chromed dyeings which are pure red-violet and are very fast to light, fulling and potting.

BERNHARD RICHARD.